US012559060B2

(12) United States Patent
Nakahashi

(10) Patent No.: US 12,559,060 B2
(45) Date of Patent: Feb. 24, 2026

(54) OCCUPANT RESTRAINT DEVICE

(71) Applicant: SUBARU CORPORATION, Tokyo (JP)

(72) Inventor: Keita Nakahashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/928,303

(22) Filed: Oct. 28, 2024

(65) Prior Publication Data

US 2025/0196801 A1      Jun. 19, 2025

(30) Foreign Application Priority Data

Dec. 19, 2023    (JP) ................................. 2023-213875

(51) Int. Cl.
B60R 22/48 (2006.01)
B60R 22/46 (2006.01)

(52) U.S. Cl.
CPC .............. B60R 22/48 (2013.01); B60R 22/46 (2013.01); B60R 2022/4685 (2013.01)

(58) Field of Classification Search
CPC .. B60R 22/46; B60R 22/48; B60R 2022/4685
See application file for complete search history.

(56) References Cited

U.S. PATENT DOCUMENTS

| 2016/0001781 A1* | 1/2016 | Fung ......................... G07C 9/37 |
| | | 701/36 |
| 2021/0107429 A1* | 4/2021 | Fukuta .................... B60R 22/48 |
| 2024/0101060 A1* | 3/2024 | Bartlett ................. B60R 21/013 |

FOREIGN PATENT DOCUMENTS

| DE | 102018209958 A1 * | 12/2019 | ............. B60R 21/01 |
| JP | 2011230691 A * | 11/2011 | ............. B60R 22/48 |
| JP | 2018-138411 A | 9/2018 | |

* cited by examiner

*Primary Examiner* — James A English
(74) *Attorney, Agent, or Firm* — Rimon P.C.

(57) ABSTRACT

An occupant restraint device is configured to restrain an occupant seated in a seat of a vehicle. The occupant restraint device includes a seat belt unit and a seat belt controller. The seat belt unit is configured to perform a restraint of the occupant by actuating a motor and winding a webbing. The seat belt controller is configured to control the seat belt unit to suit a drive mode of the vehicle. The seat belt controller is configured to, when the drive mode of the vehicle is switched to a rough road mode suitable for driving on a rough road or a sports mode suitable for sports driving, control the seat belt unit to perform the restraint of the occupant.

7 Claims, 4 Drawing Sheets

FIG. 3

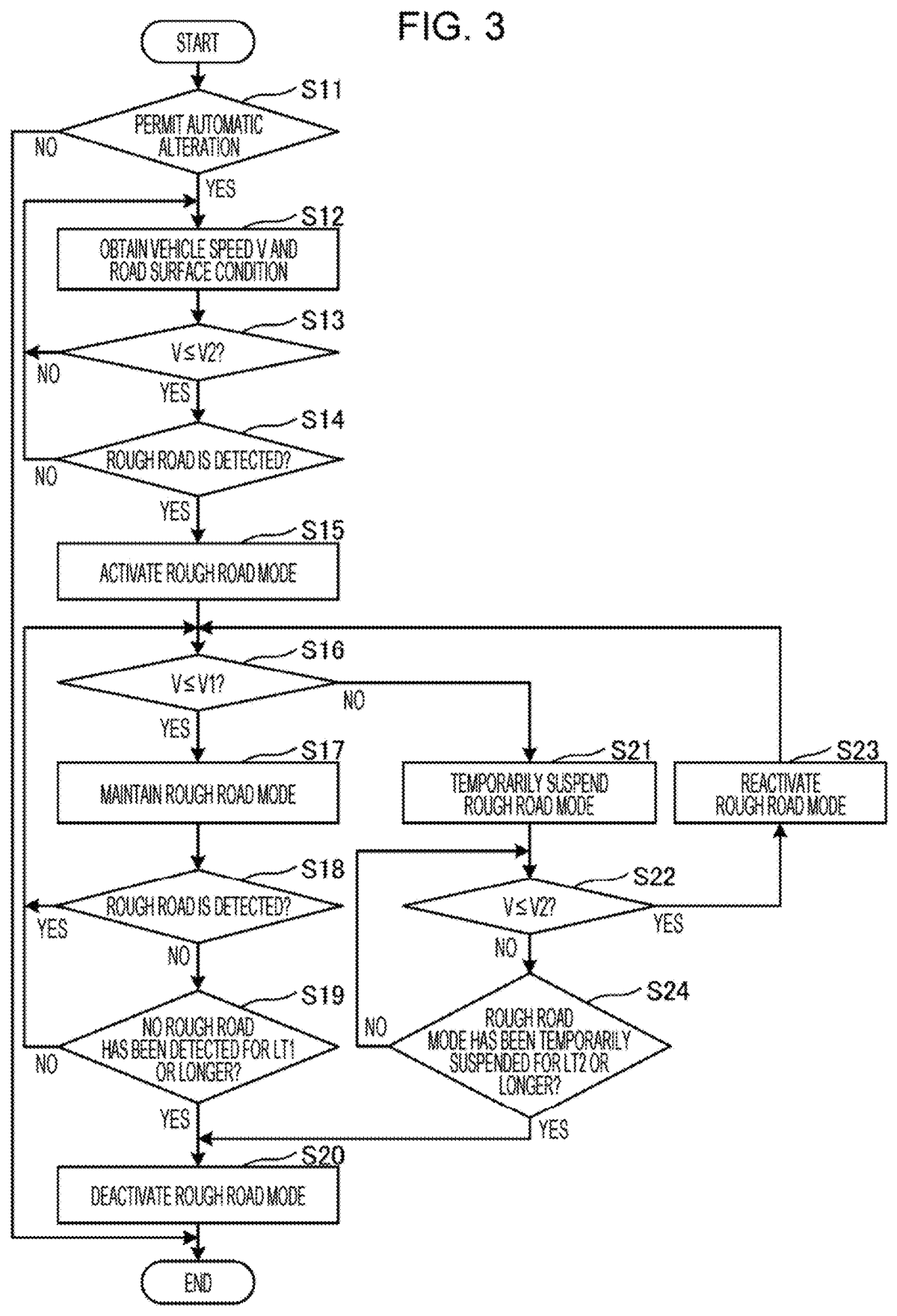

START

S11
PERMIT AUTOMATIC ALTERATION
NO
YES

S12
OBTAIN VEHICLE SPEED V AND ROAD SURFACE CONDITION

S13
$V \leq V2$?
NO
YES

S14
ROUGH ROAD IS DETECTED?
NO
YES

S15
ACTIVATE ROUGH ROAD MODE

S16
$V \leq V1$?
NO
YES

S17
MAINTAIN ROUGH ROAD MODE

S21
TEMPORARILY SUSPEND ROUGH ROAD MODE

S23
REACTIVATE ROUGH ROAD MODE

S18
ROUGH ROAD IS DETECTED?
YES
NO

S22
$V \leq V2$?
NO
YES

S19
NO ROUGH ROAD HAS BEEN DETECTED FOR LT1 OR LONGER?
NO
YES

S24
ROUGH ROAD MODE HAS BEEN TEMPORARILY SUSPENDED FOR LT2 OR LONGER?
NO
YES

S20
DEACTIVATE ROUGH ROAD MODE

END

OCCUPANT RESTRAINT DEVICE

CROSS-REFERENCE TO RELATED APPLICATIONS

The present application claims priority from Japanese Patent Application No. 2023-213875 filed on Dec. 19, 2023, the entire contents of which are hereby incorporated by reference.

BACKGROUND

The disclosure relates to occupant restraint devices installed in vehicles.

As an example of a protective device for restraining or protecting an occupant seated in a vehicle seat, an electric occupant restraint device (motor seat belt (MSB)) that winds a webbing using an actuator such as a motor is known (Japanese Unexamined Patent Application Publication No. 2018-138411). For example, when the occupant's body swings significantly and the seating position is disturbed, such as during strong braking such as a pre-crash brake, the MSB quickly restrains the occupant by winding the webbing using the actuator. Such restraint can correct the occupant's seating position, thereby maximizing the effectiveness of, for example, airbag devices. As a result, the occupant can be prevented from receiving injuries due to improper positions in situations where collisions are unavoidable.

SUMMARY

An aspect of the disclosure provides an occupant restraint device configured to restrain an occupant seated in a seat of a vehicle. The occupant restraint device includes a seat belt unit and a seat belt controller. The seat belt unit is configured to perform a restraint of the occupant by actuating a motor and winding a webbing. The seat belt controller is configured to control the seat belt unit to suit a drive mode of the vehicle. The seat belt controller is configured to, when the drive mode of the vehicle is switched to a rough road mode suitable for driving on a rough road or a sports mode suitable for sports driving, control the seat belt unit to perform the restraint of the occupant.

An aspect of the disclosure provides an occupant restraint device configured to restrain an occupant seated in a seat of a vehicle. The occupant restraint device includes a seat belt unit and circuitry. The seat belt unit comprises a motor and a webbing, and is configured to perform a restraint of the occupant by actuating the motor and winding the webbing. The circuitry is configured to control the seat belt unit to suit a drive mode of the vehicle. The circuitry is configured to, when the drive mode of the vehicle is switched to a rough road mode suitable for driving on a rough road or a sports mode suitable for sports driving, control the seat belt unit to perform the restraint of the occupant.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

FIG. 3 is a flowchart illustrating an automatic drive mode alteration process performed by a drive mode control ECU according to the embodiment of the disclosure.

DETAILED DESCRIPTION

For the purpose of preventing excessive or unnecessary restraint and discomfort of the occupant caused by excessive or unnecessary restraint, the MSB controls the motor to restrain the occupant when the detection value of, for example, the acceleration sensor reaches a predetermined threshold, in other words, strong braking occurs. However, in some situations such as when the vehicle vibrates significantly causing the occupant's body swings greatly during driving on rough roads such as unpaved roads or sports driving on, for example, circuits, it may be appropriate to correct or stabilize the seating position through restraint by the MSB.

It is desirable to quickly restrain occupants in emergencies or in response to the occupants' requests while minimizing occupant's discomfort.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
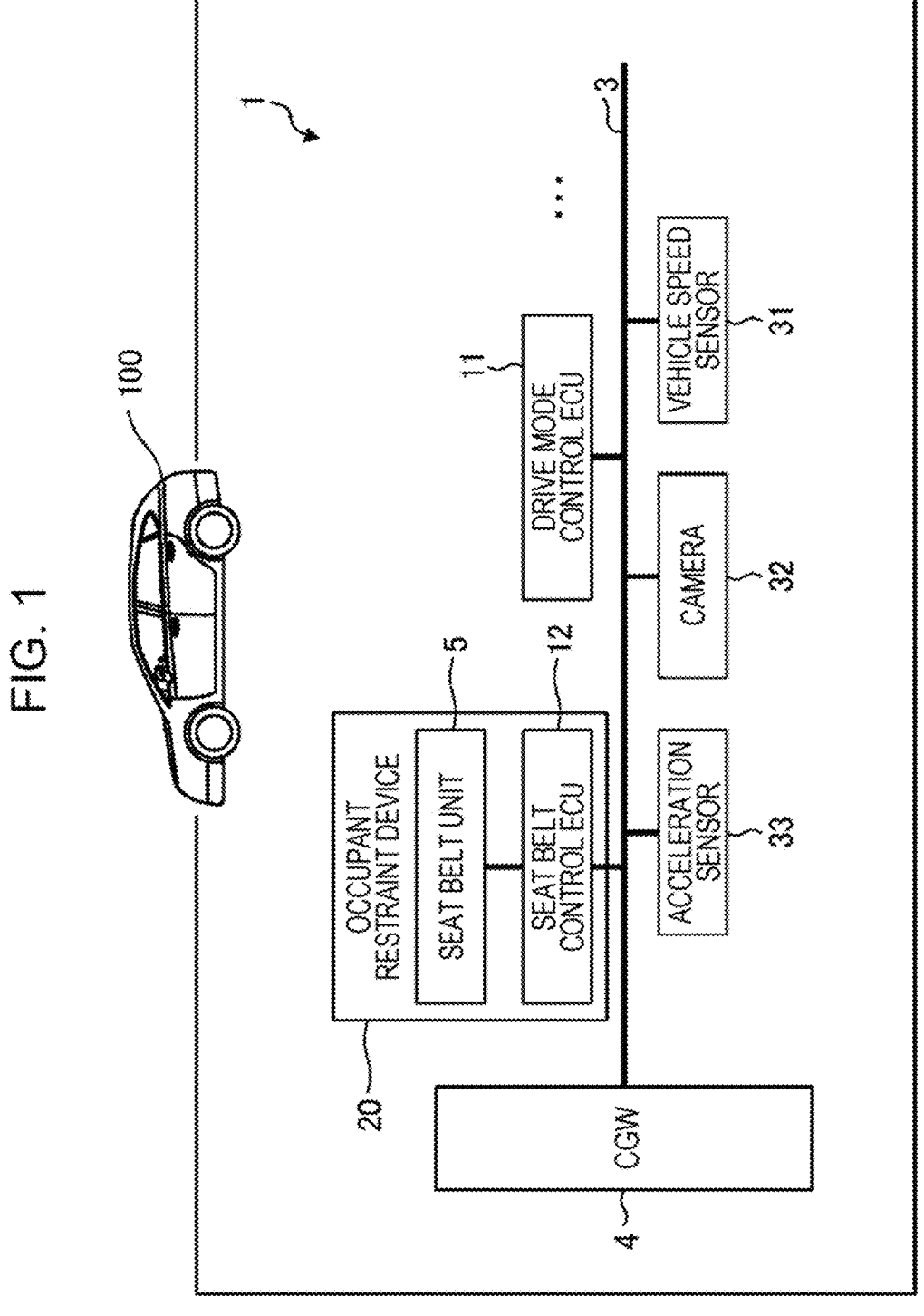
FIG. 1 illustrates a schematic configuration of a vehicle control system including an occupant restraint device according to an embodiment of the disclosure.

As illustrated in FIG. 1, an occupant restraint device 20 according to the present embodiment includes a seat belt unit 5 for restraining an occupant and a seat belt control electronic control unit (ECU) (seat belt controller) 12 for controlling the seat belt unit 5. The occupant restraint device 20 operates as a portion of a vehicle control system 1 installed in a vehicle 100 as illustrated in FIG. 1.

The vehicle control system 1 is installed in the vehicle 100. The vehicle control system 1 includes multiple sensors that obtain information indicating the driving condition of the vehicle 100 and the surrounding environment, as well as multiple ECUs that control various electronic devices used for driving of the vehicle 100. The sensors and the ECUs are coupled to each other to enable mutual communications through an in-vehicle network 3, such as a controller area network (CAN) or a local interconnect network (LIN), and a central gateway (CGW) 4 serving as a relay device.

In the vehicle control system 1, the information (data) obtained by each sensor can be output to the in-vehicle network 3, and each ECU is operable to control the operation of each electronic device based on the information obtained from the in-vehicle network 3. Each ECU is also operable to output information indicating, for example, the operating condition of the corresponding electronic device to the in-vehicle network 3.

The sensors include a vehicle speed sensor 31 for detecting the travel speed of the vehicle 100, a camera 32 for imaging a predetermined range ahead including the road surface in the travel direction of the vehicle 100, and an acceleration sensor 33 for detecting accelerations in the forward-backward, up-down, and left-right directions of the vehicle 100. The ECUs include a drive mode control ECU 11 and the seat belt control ECU 12. As for the vehicle control system 1, illustrations and detailed description of components such as electronic devices, sensors, and ECUs that are not involved in the operation of the occupant restraint device 20 will be omitted.

Each ECU is implemented by, for example, a processor such as a central processing unit (CPU) or micro processing unit (MPU), an electrical circuit, a volatile storage element such as a random access memory (RAM) that temporarily processes data used by the CPU or MPU, and a non-volatile storage element such as a read-only memory (ROM) that stores programs or the like executed by the CPU or MPU. Some or all of the operations executed by the ECUs can be implemented by hardware such as an application-specific integrated circuit (ASIC), field-programmable gate array (FPGA), or graphics processing unit (GPU).

In the drive mode control ECU 11, the non-volatile storage element such as a ROM included in the drive mode control ECU 11 stores multiple preprogrammed drive modes such as drive modes corresponding to various road surface conditions and a drive mode for suppressing fuel consumption. These multiple drive modes include a normal mode, suitable for driving on regular road surfaces, a rough road mode, suitable for driving on rough roads (including off-roads such as unpaved roads and wildland), and a sports mode, suitable for sports driving.

Each drive mode is programmed to control components such as the engine or actuating motor and the transmission to suit the drive mode. The drive mode control ECU 11 outputs control signals to the ECUs to ensure that the vehicle 100 operates in the set drive mode.

When an input operation indicating an instruction to alter the drive mode is performed, the drive mode control ECU 11 alters the drive mode in accordance with the input operation. The drive mode control ECU 11 can also be set to perform driving while automatically altering the drive mode to suit the driving environment that can change during driving. In the drive mode control ECU 11, whether automatic drive mode alteration is permitted or not permitted can be preset in accordance with an input operation by, for example, the occupant.

When automatic drive mode alteration is permitted, the drive mode control ECU 11 obtains the vehicle speed of the vehicle 100 and the road surface condition in the travel direction of the vehicle 100 from components such as the vehicle speed sensor 31, the camera 32, and the acceleration sensor 33 through the in-vehicle network 3 at predetermined intervals. When these kinds of information satisfy predetermined conditions, the drive mode control ECU 11 automatically alters the drive mode.

The drive mode control ECU 11 stores, for example, a condition for switching to the rough road mode, a condition for temporarily suspending the rough road mode, and a condition for deactivating the rough road mode (switching to another drive mode), in the ROM as conditions for auto-matic drive mode alteration. When these conditions are satisfied, the drive mode control ECU 11 automatically alters the drive mode.

In an example, a condition for switching to the rough road mode is predetermined such that a vehicle speed V of the vehicle 100 is lower than or equal to a predetermined second speed V2, and the road on which the vehicle 100 travels is a rough road. A condition for temporarily suspending the rough road mode is predetermined such that the vehicle speed V is higher than a predetermined first speed V1. A condition for deactivating the rough road mode (switching to another drive mode) is predetermined such that no rough road has been detected for a first duration LT1 or longer while the vehicle speed V is lower than or equal to the first speed V1, or the rough road mode has been temporarily suspended for a second duration LT2 or longer.

As described above, when automatic drive mode alteration is permitted, the drive mode control ECU 11 monitors the vehicle speed and the road surface condition during driving. when the vehicle speed V of the vehicle 100 is lower than or equal to the predetermined second speed V2, and a rough road is detected, the drive mode control ECU 11 automatically switches from the set drive mode to the rough road mode.

After switching to the rough road mode, when it is detected that the vehicle speed V is higher than the first speed V1, the drive mode control ECU 11 temporarily suspends the rough road mode, in other words, temporarily switches to another drive mode. When the rough road mode has been temporarily suspended for the second duration LT2, or no rough road has been detected for the first duration LT1 or longer, the drive mode control ECU 11 automatically deactivates the rough road mode, in other words, switches to another drive mode. Here, in some embodiments, the first speed V1 is higher than the second speed V2. An example of an automatic drive mode alteration process performed by the drive mode control ECU 11 will be described later.

Figure 2:
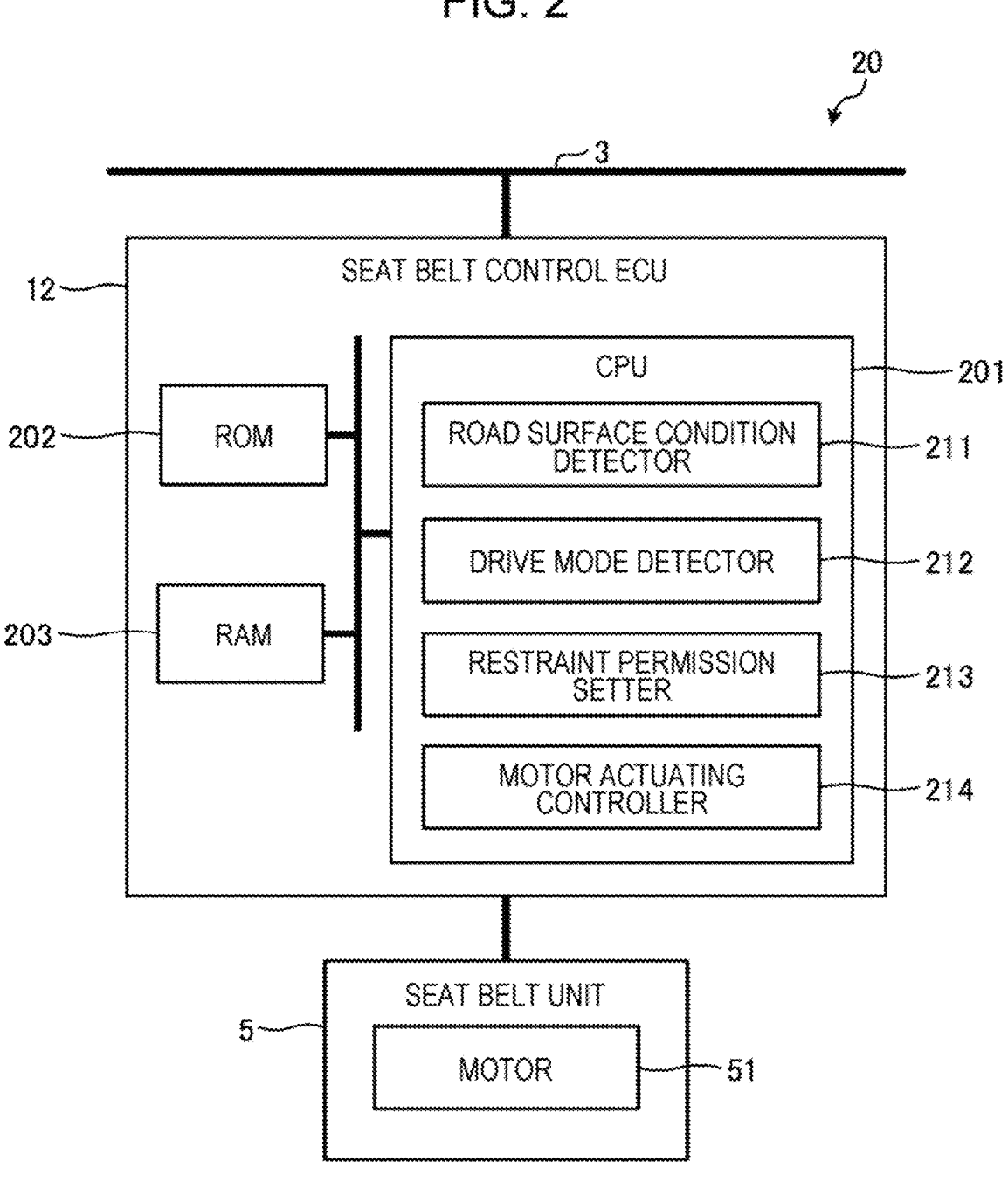
FIG. 2 illustrates a schematic configuration of a seat belt control electronic control unit (ECU) according to the embodiment of the disclosure.

As illustrated in FIG. 2, the seat belt control ECU 12 is coupled to the seat belt unit 5. The seat belt control ECU 12 cooperates with the seat belt unit 5 and serves as the occupant restraint device 20. The seat belt unit 5 includes a motor 51 for rotating a spool with a webbing wound around the spool. By actuating the motor 51 in response to a control signal from the seat belt control ECU 12 to wind the webbing, the seat belt unit 5 restrains the occupant seated in a seat of the vehicle 100.

In the vehicle 100, when the acceleration detected by the acceleration sensor 33 exceeds a threshold, for example, an ECU included in advanced driver-assistance systems (ADAS) that support the operation of the vehicle 100 predicts a collision and outputs a collision prediction signal. In response to receiving the collision prediction signal, the seat belt control ECU 12 actuates the motor 51 and winds the webbing to restrain the occupant.

When no collision is predicted, in other words, the seat belt control ECU 12 does not receive any collision prediction signal, the occupant may still desire to be restrained due to the driving condition of the vehicle 100. In such cases, the seat belt control ECU 12 controls the seat belt unit 5 based on the occupants' request to restrain the occupant.

The seat belt control ECU 12 includes a CPU 201, a ROM 202, and a RAM 203. The CPU 201 executes various operations based on programs stored in the ROM 202. In the present embodiment, the CPU 201 serves as a road surface condition detector 211, a drive mode detector 212, a restraint permission setter 213, and a motor actuating controller 214, which are illustrated in FIG. 2, by loading programs stored in the ROM 202 into a memory such as the RAM 203 and running the programs. In the following, the road surface condition detector 211, the drive mode detector 212, the restraint permission setter 213, and the motor actuating controller 214 will be described.

The road surface condition detector 211 detects the condition of the road surface in the travel direction of the vehicle 100. The road surface condition detector 211 detects the road surface condition, for example, based on the image of the area ahead of the vehicle 100 captured by the camera 32. The road surface condition detector 211 also monitors the road surface condition based on the acceleration in the vehicle's up-down direction, which is input to the vehicle 100 and detected by the acceleration sensor 33. The road surface condition detector 211 may also detect the road surface condition from information about the external environment around the vehicle 100, monitored by various sensors such as radars included in the ADAS that supports the operation of the vehicle 100.

The drive mode detector 212 detects the drive mode set by the drive mode control ECU 11, as well as deactivation (alteration) or temporary suspension (temporary alteration) of the set drive mode. For example, the drive mode detector 212 obtains information about the set drive mode and information about drive mode changes such as deactivation (alteration) and temporary suspension (temporary alteration) of the drive mode from the drive mode control ECU 11 through the in-vehicle network 3.

The restraint permission setter 213 sets whether restraint using the seat belt unit 5 is permitted or not permitted when driving in the rough road mode or the sports mode, based on an input operation by the occupant.

The motor actuating controller 214 controls the seat belt unit 5 to suit the drive mode of the vehicle 100. For example, when the drive mode of the vehicle 100 is switched to the rough road mode or the sports mode, in other words, when the drive mode detector 212 detects that the drive mode has been switched to the rough road mode or the sports mode, the motor actuating controller 214 actuates the motor 51 and winds the webbing to restrain the occupant.

At this time, in the case where automatic drive mode alteration is permitted by the drive mode control ECU 11, and restraint using the seat belt unit 5 is permitted by the restraint permission setter 213, the motor actuating controller 214 actuates the motor 51 and winds the webbing to restrain the occupant when switching to the rough road mode or the sports mode.

At this time, in the case where automatic drive mode alteration is permitted by the drive mode control ECU 11, but restraint using the seat belt unit 5 is not permitted by the restraint permission setter 213, the motor actuating controller 214 does not actuate the motor 51 and does not wind the webbing to restrain the occupant when switching to the rough road mode or the sports mode is detected.

When the occupant performs an input operation to switch to the rough road mode or the sports mode, whether to restrain the occupant using the seat belt unit 5 is determined based on whether restraint is permitted or not permitted by the restraint permission setter 213.

This implies that regardless of whether drive mode alteration is performed automatically or manually, in the case where restraint using the seat belt unit 5 is permitted by the restraint permission setter 213, the motor actuating controller 214 actuates the motor 51 and winds the webbing to restrain the occupant when switching to the rough road mode or the sports mode. In the case where restraint using the seat belt unit 5 is not permitted by the restraint permission setter 213, the motor actuating controller 214 does not actuate the motor 51 and wind the webbing to restrain the occupant when switching to the rough road mode or the sports mode is detected.

When the rough road mode or the sports mode is temporarily suspended or deactivated, in other words, when the rough road mode or the sports mode is switched to another drive mode, the motor actuating controller 214 determines the timing to release the occupant's restraint using the seat belt unit 5 based on the road surface condition and releases the occupant's restraint at the determined timing.

Figure 4:
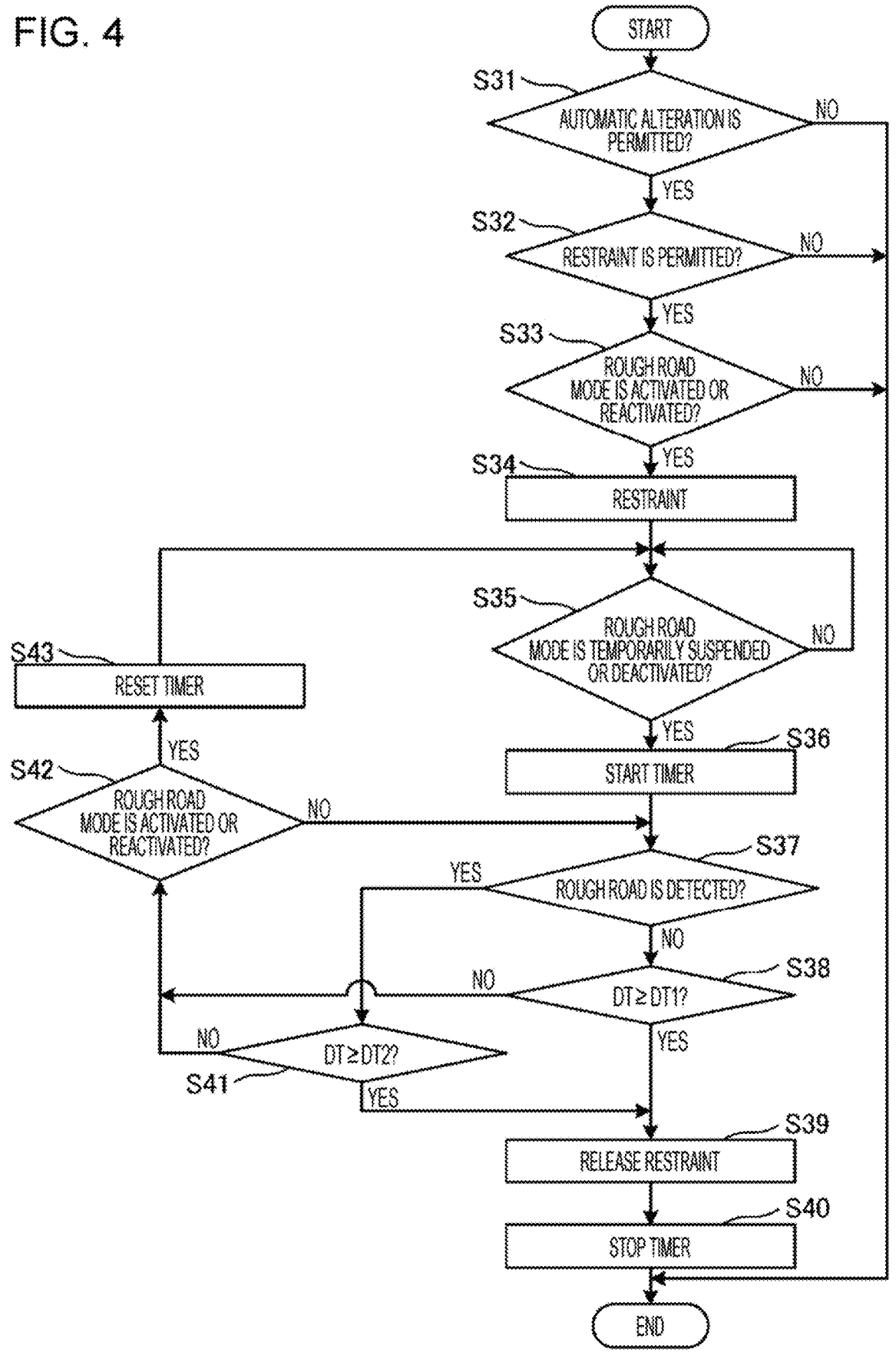
FIG. 4 is a flowchart illustrating an occupant restraint process performed by the seat belt control ECU according to the embodiment of the disclosure.

In the following, an automatic drive mode alteration process performed by the drive mode control ECU 11 and a restraint process performed by the seat belt control ECU 12 in conjunction with automatic drive mode alteration will be described with reference to FIGS. 3 and 4.

First, the automatic drive mode alteration process performed by the drive mode control ECU 11 will be described using a flowchart in FIG. 3. FIG. 3 illustrates an example automatic drive mode alteration process of switching from the normal mode to the rough road mode. When automatic drive mode alteration is permitted (YES in step S11), the drive mode control ECU 11 performs the automatic drive mode alteration process by following the subsequent steps. When automatic drive mode alteration is not permitted (NO in step S11), the drive mode control ECU 11 does not perform automatic alteration.

When automatic drive mode alteration is permitted (YES in step S11), the drive mode control ECU 11 obtains the vehicle speed V of the vehicle 100 and the road surface condition in the travel direction of the vehicle 100 at predetermined intervals during driving (step S12). In the subsequent steps, in the case where operating in the normal mode, when switching to the rough road mode is not performed, the drive mode control ECU 11 monitors whether the vehicle speed V of the vehicle 100 is lower than or equal to the second speed V2 (step S13) and whether the travel lane of the vehicle 100 is a rough road (step S14).

When the vehicle speed V is higher than the second speed V2 (NO in step S13), or when no rough road is detected (NO in step S14), the drive mode control ECU 11 continues to monitor the vehicle speed V and the road surface condition without altering the drive mode (repeating steps S12 to S14).

When the vehicle speed V is lower than or equal to the second speed V2 (YES in step S13), and a rough road is detected (YES in step S14), the drive mode control ECU 11 switches the drive mode of the vehicle 100 to the rough road mode (step S15).

After the drive mode is switched to the rough road mode, the drive mode control ECU 11 continues to obtain the vehicle speed V of the vehicle 100 and the road surface condition in the travel direction of the vehicle 100 and monitor whether the vehicle speed V becomes lower than or equal to the first speed V1 (step S16). When the vehicle speed V is lower than or equal to the first speed V1 (YES in step S16), the drive mode control ECU 11 maintains the rough road mode (step S17). When the vehicle speed V is higher than the first speed V1 (NO in step S16), the drive mode control ECU 11 temporarily suspends the rough road mode (step S21).

While maintaining the rough road mode (step S17), when the vehicle speed V is lower than or equal to the first speed V1, and a rough road is detected during driving in the rough road mode (YES in step S18), the drive mode control ECU 11 returns to step S16 and repeats the operations. When the vehicle speed V is lower than or equal to the first speed V1, and no rough road is detected during driving in the rough road mode (NO in step S18), the drive mode control ECU 11 monitors the duration for which no rough road has been detected (rough road undetected time) (step S19). When the rough road undetected time is longer than or equal to the first duration LT1 (YES in step S19), the drive mode control ECU 11 deactivates the rough road mode (step S20), in other words, switches to the normal mode.

When the rough road mode is temporarily suspended (step S21), the drive mode control ECU 11 monitors whether the vehicle speed V is lower than or equal to the second speed V2 (step S22). When the vehicle speed V is lower than or equal to the second speed V2 (YES in step S22), the drive mode control ECU 11 reactivates the rough road mode (step S23). When the vehicle speed V is higher than the second speed V2 (NO in step S22), the drive mode control ECU 11 monitors the duration for which the vehicle speed V remains higher than the second speed V2 (temporary suspension duration) (step S24). When the temporary suspension duration is longer than or equal to the second duration LT2 (YES in step S24), the drive mode control ECU 11 deactivates the rough road mode (step S20), in other words, switches to the normal mode.

In the above example, the automatic alteration process of switching from the normal mode to the rough road mode has been described. However, the automatic alteration process of switching from the normal mode to the sports mode can be implemented by storing automatic alteration conditions in the ROM of the drive mode control ECU 11 and performing the automatic alteration process in accordance with these conditions.

Next, an occupant restraint process performed by the seat belt control ECU 12 will be described using a flowchart in FIG. 4. FIG. 4 illustrates an example restraint process performed in conjunction with automatic alteration of switching to the rough road mode. When automatic drive mode alteration is permitted by the drive mode control ECU 11 (YES in step S31), the seat belt control ECU 12 performs the occupant restraint process in the subsequent steps to align with automatic drive mode alteration. When automatic drive mode alteration is not permitted (NO in step S31), the seat belt control ECU 12 does not perform the occupant restraint process.

When restraint using the seat belt unit 5 during driving in the rough road mode or the sports mode is permitted in the setting in the restraint permission setter 213 (YES in step S32), the seat belt control ECU 12 performs the occupant restraint process by following the subsequent operations. When restraint is not permitted in the setting (NO in step S32), the seat belt control ECU 12 does not perform the occupant restraint process.

When automatic drive mode alteration is permitted by the drive mode control ECU 11 (YES in step S31), and restraint using the seat belt unit 5 is permitted (YES in step S32), the seat belt control ECU 12 monitors whether the drive mode detector 212 detects switching to the rough road mode (step S33).

When switching to the rough road mode (including turning on and reactivating the rough road mode) is detected by the drive mode detector 212 (YES in step S33), the motor actuating controller 214 actuates the motor 51 of the seat belt unit 5 and winds the webbing to restrain the occupant (step S34). As such, the vehicle 100 can restrain the occupant during driving in the rough road mode.

During driving in the rough road mode, the drive mode detector 212 monitors whether a rough road mode-off signal indicating temporary suspension or deactivation of the rough road mode is received from the drive mode control ECU 11

(step S35). When a rough road mode-off signal is received (YES in step S35), a timer included in the seat belt control ECU 12 starts to measure a driving time DT during which driving is performed while the rough road mode is temporarily suspended or deactivated, in other words, driving is performed in another drive mode (step S36).

The seat belt control ECU 12 monitors whether the road surface condition detector 211 detects a rough road while measuring the driving time DT in the state where the rough road mode is temporarily suspended or deactivated (step S37). The seat belt control ECU 12 also monitors whether the driving time DT in the state where no rough road is detected (NO in step S37) reaches or exceeds a predetermined first driving time DT1 (step S38) or whether the driving time DT in the state where a rough road is detected (YES in step S37) reaches or exceeds a predetermined second driving time DT2 (step S41).

While measuring the driving time DT, the seat belt control ECU 12 monitors whether the rough road mode is turned on or reactivated (step S42). When the rough road mode is not turned on or reactivated (NO in step S42), and the driving time DT while no rough road has been detected is longer than or equal to the first driving time DT1 (YES in step S38), the seat belt control ECU 12 releases the restraint (step S39) and stops measuring the driving time DT using the timer (step S40). This process avoids continuously restraining the occupant for a long time when no rough road is detected. Thus, in some embodiments, the first driving time DT1 is set to a duration that reduces the occupant's discomfort.

While the seat belt control ECU 12 measures the driving time DT and monitors whether the rough road mode is turned on or reactivated (step S42), in the case where the rough road mode is not turned on or reactivated (NO in step S42), and a rough road is detected (YES in step S37), when the driving time DT is longer than or equal to the second driving time DT2 (YES in step S41), the seat belt control ECU 12 releases the restraint (step S39) and stops measuring the driving time DT using the timer (step S40).

As described above, when the rough road mode is temporarily suspended or deactivated, and a rough road is detected, the seat belt control ECU 12 continuously monitors whether the rough road mode is turned on or reactivated until the second driving time DT2 elapses. When a rough road is detected, it is assumed that the rough road is severe enough to turn on or reactivate the rough road mode. However, in some cases such as when the road is partially rough due to rainy weather, it may be assumed not to restrain the occupant. By monitoring whether the rough road mode is turned on or reactivated while continuing to restrain the occupant until the second driving time DT2 elapses, it is possible to accurately judge whether the rough road is severe enough to turn on or reactivate the rough road mode. Thus, in some embodiments, the second driving time DT2 is set to a duration longer than the first driving time DT1.

While the seat belt control ECU 12 measures the driving time DT and monitors whether the rough road mode is turned on or reactivated (step S42), when the rough road mode is turned on or reactivated (YES in step S42), the seat belt control ECU 12 resets the measuring time using the timer (step S43) and returns to step S35 and repeats the operations.

The foregoing described, as an example, the restraint process performed in conjunction with automatic alteration of switching to the rough road mode. However, the restraint process performed in conjunction with automatic alteration of switching to the sports mode can also be performed in the same manner as the restraint process performed in conjunction with automatic alteration of switching to the rough road mode.

In the occupant restraint device 20 according to the present embodiment configured in this manner, the seat belt control ECU 12 restrains the occupant by actuating the motor 51 of the seat belt unit 5 and winding the webbing when a collision is predicted in the vehicle 100.

In the case where no collision is predicted, the occupant restraint device 20 restrains the occupant when restraint is permitted at the request of the occupant, in other words, through an input operation by the occupant, for example, while driving in the rough road mode or the sports mode where the occupant's body swings and the seating position is disturbed. In one example, when automatic drive mode alteration of the vehicle 100 is permitted, the occupant restraint device 20 restrains the occupant in conjunction with switching to the rough road mode or the sports mode.

According to the present embodiment described above, when there is no input operation by the occupant and restraint is not permitted, the occupant restraint operation to suit the drive mode is not performed. This configuration avoids unnecessary occupant restraint and can prevent discomfort to the occupant. However, the occupant can be quickly restrained in emergencies such as when a collision is predicted, or when restraint is permitted through an input operation by the occupant. Overall, according to the present embodiment described above, occupants can be quickly restrained in emergencies or in response to occupants' requests while occupant's discomfort is minimized.

The embodiment of the disclosure has been described in detail above with reference to the drawings. However, specific configuration features are not limited to this embodiment, and all design changes made without departing from the spirit of the disclosure are intended to be encompassed by the disclosure. The embodiments described above can use the technologies with each other and can be combined, provided that there are no particular inconsistencies or issues in terms of purpose and configuration.

The seat belt control ECU 12 illustrated in FIG. 2 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the seat belt control ECU 12 including the road surface condition detector 211, the drive mode detector 212, the restraint permission setter 213, and the motor actuating controller 214. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 2.

The invention claimed is:

1. An occupant restraint device configured to restrain an occupant seated in a seat of a vehicle, the occupant restraint device comprising:

a seat belt unit configured to perform a restraint of the occupant by actuating a motor and winding a webbing; and a seat belt controller configured to control the seat belt unit to suit a drive mode of the vehicle, the seat belt controller being configured to;

detect a road-surface condition in a travel direction of the vehicle;

when the drive mode of the vehicle is switched to a rough road mode suitable for driving on a rough road or a sports mode suitable for sports driving, control the seat belt unit to perform the restraint of the occupant; and after switching the drive mode of the vehicle from the rough road mode or the sports mode to another drive mode, (i) when the detected road-surface condition indicates the rough road, release the restraint of the occupant using the seat belt unit after a first driving time elapses, and (ii) when the detected road-surface condition does not indicate the rough road, release the restraint of the occupant using the seat belt unit after a second driving time longer than the first driving time elapses.

2. The occupant restraint device according to claim 1, wherein the seat belt controller is further configured to detect the road-surface condition based on an image captured by a camera or an acceleration detected by an acceleration sensor of the vehicle.

3. The occupant restraint device according to claim 1, wherein the seat belt controller is further configured to:

determine whether automatic alteration of the drive mode of the vehicle to the rough road mode or the sports mode is permitted based on a vehicle speed and the detected road surface condition;

set whether the restraint using the seat belt unit during driving in the rough road mode or the sports mode is permitted; and when the automatic alteration is permitted and the restraint is permitted, control the seat belt unit to perform the restraint of the occupant in conjunction with alteration of the drive mode.

4. An occupant restraint device configured to restrain an occupant seated in a seat of a vehicle, the occupant restraint device comprising:

a seat belt unit configured to perform a restraint of the occupant by actuating a motor and winding a webbing; and a seat belt controller configured to:

detect a road-surface condition in a travel direction of the vehicle;

determine whether automatic alteration of a drive mode of the vehicle to a rough road mode suitable for driving on a rough road or a sports mode suitable for sports driving is permitted based on a vehicle speed and the detected road surface condition;

set whether the restraint using the seat belt unit during driving in the rough road mode or the sports mode is permitted; and when the automatic alteration is permitted and the restraint is permitted, control the seat belt unit to perform the restraint of the occupant in conjunction with alteration of the drive mode.

5. The occupant restraint device according to claim 4, wherein the seat belt controller is further configured to:

when the drive mode of the vehicle is switched to the rough road mode or the sports mode suitable, control the seat belt unit to perform the restraint of the occupant; and after switching the drive mode of the vehicle from the rough road mode or the sports mode to another drive mode, (i) when the detected road-surface condition indicates the rough road, release the restraint of the occupant using the seat belt unit after a first driving time elapses, and (ii) when the detected road-surface condition does not indicate the rough road, release the restraint of the occupant using the seat belt unit after a second driving time longer than the first driving time elapses.

6. An occupant restraint device configured to restrain an occupant seated in a seat of a vehicle, the occupant restraint device comprising:

a seat belt unit comprising a motor and a webbing, the seat belt unit being configured to perform a restraint of the occupant by actuating the motor and winding the webbing; and circuitry configured to control the seat belt unit to suit a drive mode of the vehicle, the circuitry being configured to:

detect a road-surface condition in a travel direction of the vehicle;

when the drive mode of the vehicle is switched to a rough road mode suitable for driving on a rough road or a sports mode suitable for sports driving, control the seat belt unit to perform the restraint of the occupant; and after switching the drive mode of the vehicle from the rough road mode or the sports mode to another drive mode, (i) when the detected road-surface condition indicates a rough road, release the restraint of the occupant using the seat belt unit after a first driving time elapses, and (ii) when the detected road-surface condition does not indicate a rough road, release the restraint of the occupant using the seat belt unit after a second driving time longer than the first driving time elapses.

7. The occupant restraint device according to claim 6, wherein the circuitry is further configured to:

determine whether automatic alteration of the drive mode of the vehicle to the rough road mode or the sports mode is permitted based on a vehicle speed and the detected road surface condition;

set whether the restraint using the seat belt unit during driving in the rough road mode or the sports mode is permitted; and when the automatic alteration is permitted and the restraint is permitted, control the seat belt unit to perform the restraint of the occupant in conjunction with alteration of the drive mode.

* * * * *